US011001331B2

(12) United States Patent
Yaokawa et al.

(10) Patent No.: US 11,001,331 B2
(45) Date of Patent: May 11, 2021

(54) BODY FRAME FOR TWO-WHEELED MOTOR VEHICLE

(71) Applicant: HONDA MOTOR CO., LTD., Tokyo (JP)

(72) Inventors: Tetsuo Yaokawa, Wako (JP); Toru Uesaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 173 days.

(21) Appl. No.: 16/324,698

(22) PCT Filed: Aug. 30, 2017

(86) PCT No.: PCT/JP2017/031174
§ 371 (c)(1),
(2) Date: Feb. 11, 2019

(87) PCT Pub. No.: WO2018/051789
PCT Pub. Date: Mar. 22, 2018

(65) Prior Publication Data
US 2019/0217913 A1 Jul. 18, 2019

(30) Foreign Application Priority Data
Sep. 13, 2016 (JP) .............................. JP2016-178808

(51) Int. Cl.
B62K 11/04 (2006.01)
B62K 19/10 (2006.01)
B62K 19/28 (2006.01)

(52) U.S. Cl.
CPC .................... B62K 11/04 (2013.01)

(58) Field of Classification Search
CPC ........ B62K 11/02; B62K 11/04; B62K 19/10; B62K 19/08; B62K 19/28
(Continued)

(56) References Cited

U.S. PATENT DOCUMENTS

2007/0193807 A1 8/2007 Yamamoto
2014/0262568 A1 9/2014 Matsuda et al.
(Continued)

FOREIGN PATENT DOCUMENTS

FR 383577 * 3/1908
GB 1515663 A 6/1978
(Continued)

OTHER PUBLICATIONS

International Search Report (PCT/ISA/210) issued in PCT/JP2017/031174, dated Oct. 3, 2017.
(Continued)

Primary Examiner — Anne Marie M Boehler
(74) Attorney, Agent, or Firm — Birch, Stewart, Kolasch & Birch LLP

(57) ABSTRACT

A body frame of a two-wheeled motor vehicle includes a first frame extending rearward from a head pipe, a second frame disposed beneath the first frame with a gap there between, a third frame disposed beneath the second frame with a gap there between, a plate-shaped first reinforcing member provided between the first frame and the second frame, and a plate-shaped second reinforcing member provided between the second frame and the third frame, and the first reinforcing member and the second reinforcing member are formed so that external shapes thereof are connected. Thus, it is possible to provide a body frame for a two-wheeled motor vehicle that contributes to cutting the number of components and increasing the stiffness.

2 Claims, 3 Drawing Sheets

(58) Field of Classification Search
USPC .......................................................... 180/219
See application file for complete search history.

(56) References Cited

U.S. PATENT DOCUMENTS

| | | | | |
|---|---|---|---|---|
| 2015/0136510 A1* | 5/2015 | Naruoka | ................. | F02B 61/02 |
| | | | | 180/219 |
| 2016/0264204 A1* | 9/2016 | Ishii | ....................... | B62K 19/18 |
| 2017/0327174 A1* | 11/2017 | Moore | .................. | B62K 19/08 |
| 2019/0047654 A1* | 2/2019 | Hasegawa | ............. | B62K 19/06 |
| 2019/0047655 A1* | 2/2019 | Aydoung | ............. | B62K 25/283 |

FOREIGN PATENT DOCUMENTS

| | | | |
|---|---|---|---|
| JP | 59-93989 | U | 6/1984 |
| JP | 61-135879 | A | 6/1986 |
| JP | 2-204187 | A | 8/1990 |
| JP | 3-253483 | A | 11/1991 |
| JP | 7-117766 | A | 5/1995 |
| JP | 7-285483 | A | 10/1995 |
| JP | 2004-284377 | A | 10/2004 |
| JP | 2007-1344 | A | 1/2007 |
| JP | 2007-55584 | A | 3/2007 |
| JP | 2013-203124 | A | 10/2013 |
| JP | 2015-196394 | A | 11/2015 |
| WO | WO 2013/061484 | A1 | 5/2013 |
| WO | WO-2018173958 | A1 * | 9/2018 |

OTHER PUBLICATIONS

Extended European Search Report dated Aug. 14, 2019, for European Patent Application No. 17850692.9.
International Preliminary Report on Patentability, dated Jan. 10, 2019, for International Application No. PCT/JP2017/031174, with an English translation.

* cited by examiner

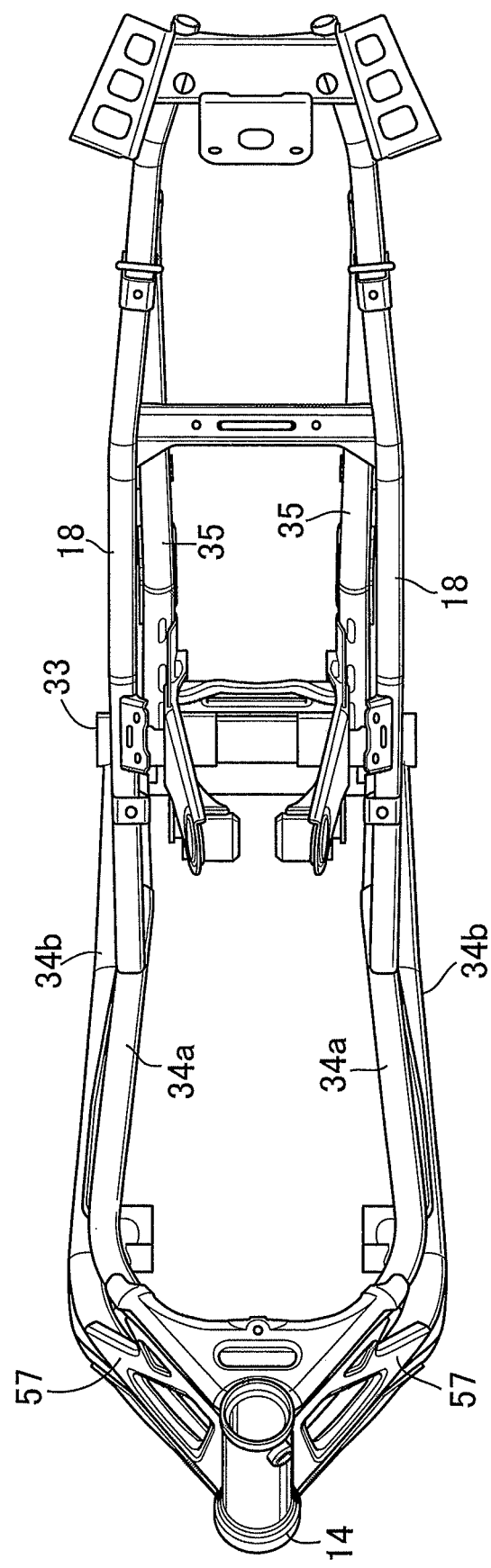

BODY FRAME FOR TWO-WHEELED MOTOR VEHICLE

TECHNICAL FIELD

The present invention relates to a body frame for use in a two-wheeled motor vehicle.

BACKGROUND ART

Patent Document 1 discloses a two-wheeled motor vehicle. The two-wheeled motor vehicle includes a main frame formed with a truss structure.

RELATED ART DOCUMENTS

Patent Documents

Patent Document 1: Japanese Patent Application Laid-open No. 2013-203124

SUMMARY OF THE INVENTION

Problems to be Solved by the Invention

With regard to the main frame with the truss structure, cutting the number of components and increasing the stiffness is an issue.

The present invention has been accomplished in light of the above circumstances, and it is an object thereof to provide a body frame for a two-wheeled motor vehicle that contributes to cutting the number of components and increasing the stiffness.

Means for Solving the Problems

According to a first aspect of the present invention, there is provided a body frame of a two-wheeled motor vehicle comprising left and right main frames extending rearward from a head pipe, the main frame including a first frame and a second frame disposed beneath the first frame with a gap therebetween, characterized in that the body frame comprises a third frame disposed beneath the second frame with a gap therebetween, a plate-shaped first reinforcing member provided between the first frame and second frame, and a plate-shaped second reinforcing member provided between the second frame and third frame, the first reinforcing member and the second reinforcing member being formed so that external shapes thereof are connected, the first reinforcing member having a cutout hole, and the second reinforcing member having a depression that is recessed from a plate surface.

According to a second aspect of the present invention, in addition to the first aspect, the second reinforcing member has a larger dimension in a fore-and-aft direction of the vehicle body than a dimension of the first reinforcing member, the external shape of the first reinforcing member between the first frame and the second frame is a straight line, and the external shape of the second reinforcing member between the second frame and the third frame spreads out in going toward the third frame.

Effects of the Invention

In accordance with the first aspect, compared with a truss structure in which the first frame and the second frame are linked via a plurality of shaft materials, the number of components and production processes can be reduced. Furthermore, the stiffness in the fore-and-aft direction is increased compared with the truss structure. The third frame can function as an engine hanger, when mounting the engine hanger the number of components and the number of production assembly steps can be reduced, and the stiffness of the structure can be increased. The first reinforcing member and the second reinforcing member can be integrated with the second frame held therebetween, and the stiffness of the structure can be increased. Further, due to the reinforcing rim being disposed so as to be continuous with the edge of the cutout hole, and the reinforcing bead being disposed so as to be continuous with the edge of the depression, the stiffness of the first and second reinforcing members increases, and it is possible to prevent the vehicle body from chattering. The appearance is also improved.

In accordance with the second aspect, due to the second reinforcing member having a larger dimension in the fore-and-aft direction of the vehicle body than that of the first reinforcing member the stiffness on the engine side is increased, and due to the external shape of the second reinforcing member between the second frame and the third frame spreading out in going toward the third frame, the face via which the second reinforcing member and the third frame are joined is enlarged, thereby making it possible to further increase the stiffness on the engine side.

BRIEF DESCRIPTION OF DRAWINGS

FIG. 3 is a plan view showing the structure of the body frame. (first embodiment)

EXPLANATION OF REFERENCE NUMERALS AND SYMBOLS

Figure 1:
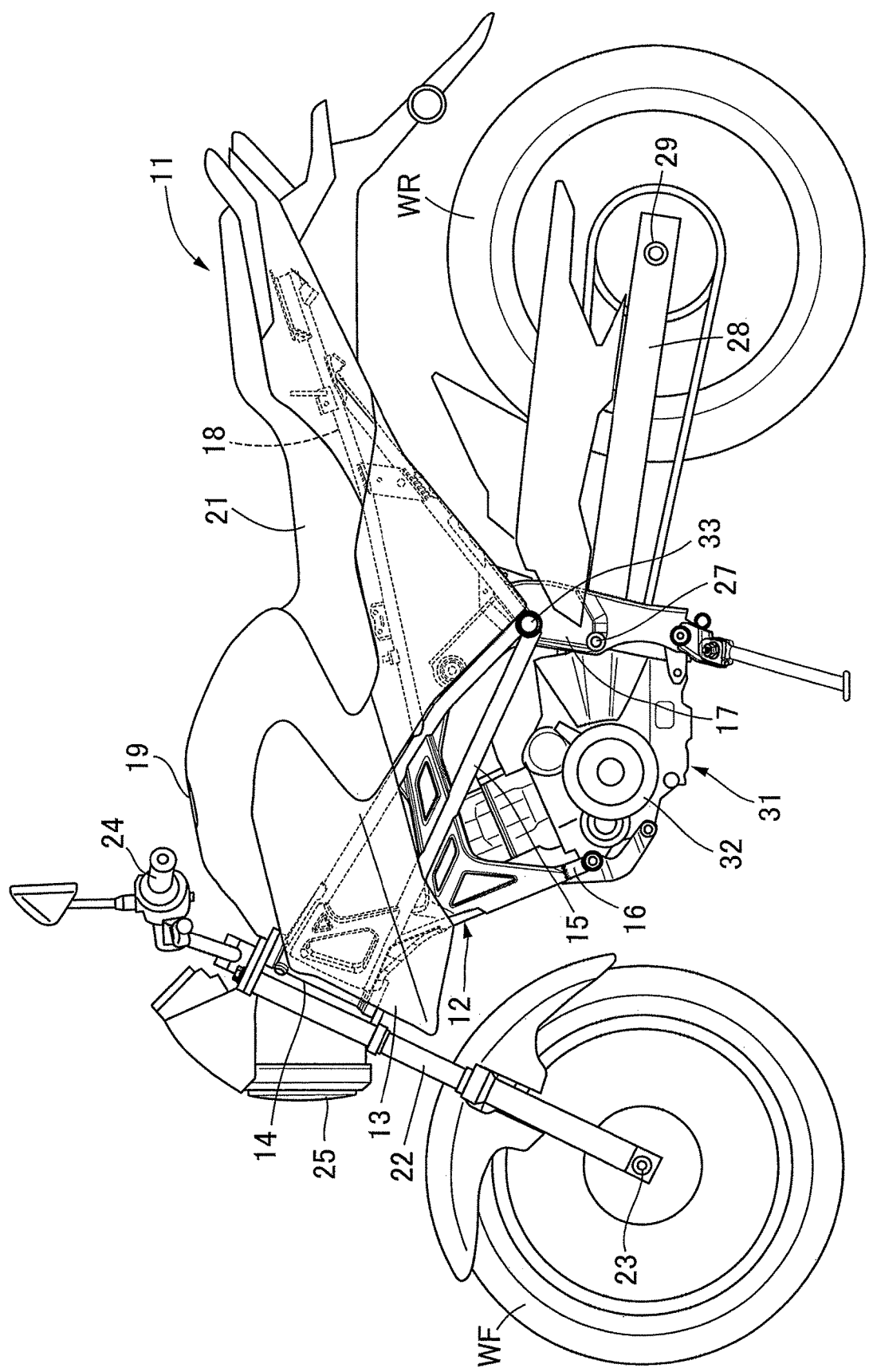
FIG. 1 is a side view schematically showing an overall picture of a two-wheeled motor vehicle related to one embodiment of the present invention. (first embodiment)

11 Two-wheeled motor vehicle
14 Head pipe
15 Main frame
16 Third frame (down frame)
34a First frame
34b Second frame
36 First reinforcing member
42 Cutout hole (opening)
45 Second reinforcing member
52 First depression
53 Second depression

MODES FOR CARRYING OUT THE INVENTION

One embodiment of the present invention is explained below by reference to the attached drawings.

First Embodiment

FIG. 1 schematically shows an overall picture of a two-wheeled motor vehicle related to one embodiment of the present invention. The two-wheeled motor vehicle 11 includes a vehicle body frame 12 and a vehicle body cover 13 that partially covers the vehicle body frame 12. The vehicle body frame 12 has a head pipe 14, a pair of left and right main frames 15 extending from the head pipe 14 downward to the rear, a pair of left and right down frames 16 disposed beneath the main frame 15 with a gap therebetween and extending from the head pipe 14 downward to the rear, a pair of left and right pivot frames 17 joined to the rear end of the respective main frame 15 and extending downward, and a pair of left and right seat frames 18 extending from the respective main frame 15 upward to the rear. An occupant seat 21 is mounted on the seat frame 18 to the rear of a fuel tank 19. The fuel tank 19 is covered by the vehicle body cover 13. The vehicle body cover 13 is molded from for example a resin material.

A front fork 22 is steerably supported on the head pipe 14. A front wheel WF is supported on the front fork 22 so that it can rotate around an axle 23. Handlebars 24 are linked to the upper end of the front fork 22. A headlight device 25 is fixed to the handlebars 24 in front of the head pipe 14.

A swing arm 28 is linked to the vehicle body frame 12 in the rear of the vehicle so that it can swing vertically around a pivot 27. A rear wheel WR is supported at the rear end of the swing arm 28 so that it can rotate around an axle 29. An internal combustion engine unit 31 is mounted on the vehicle body frame 12 between the front wheel WF and the rear wheel WR. The internal combustion engine unit 31 includes an internal combustion engine 32 that generates a driving force transmitted to the rear wheel WR.

The lower end of the main frame 15 is linked to a rear side of the internal combustion engine 32, and the lower end of the down frame 16 is linked to a front side of the internal combustion engine 32. Thus, a rigid structure is established by means of the internal combustion engine 32 in addition to the main frame 15 and the down frame 16. The down frame 16 functions as a so-called engine hanger. The left and right pivot frames 17 are linked to each other via a cross tube 33 extending in the horizontal direction. The pivot 27 is supported on the pivot frame 17.

Figure 2:
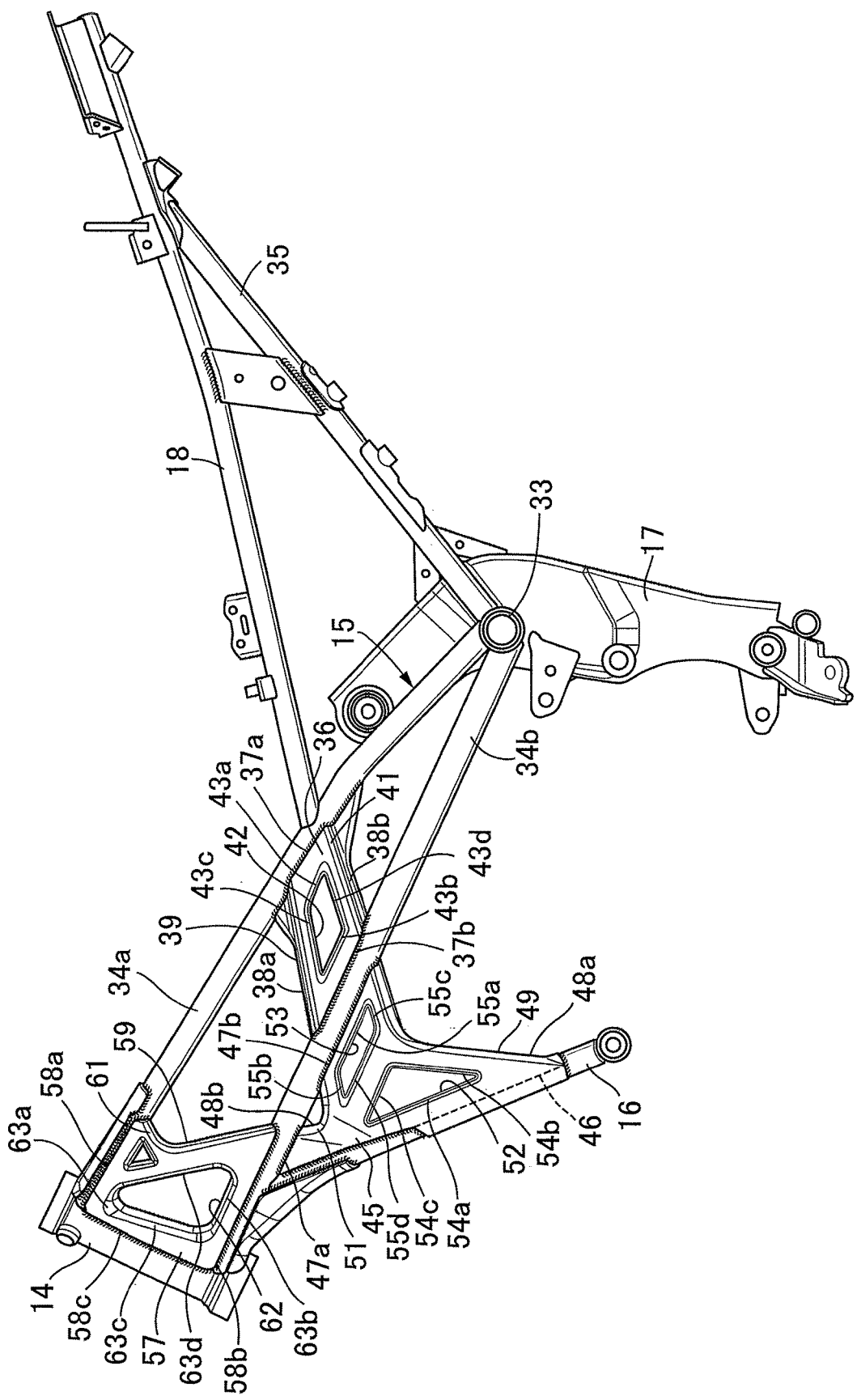
FIG. 2 is a side view showing the structure of a body frame. (first embodiment)

As shown in FIG. 2 and FIG. 3, the main frame 15 includes a first frame 34a having a front end joined to the head pipe 14 and a rear end joined to the pivot frame 17, and a second frame 34b disposed beneath the first frame 34a with a gap therebetween and having a front end joined to the head pipe 14 and a rear end joined to the pivot frame 17. The first frame 34a and the second frame 34b are formed from for example a pipe material. The cross-sectional shape of the pipe material may be circular, but is not limited to a circular shape. As the first frame 34a and the second frame 34b a long material, other than a pipe material, having the same degree of stiffness may be used. When joining, welding is for example employed.

The body frame 12 further includes a rear frame 35 disposed beneath the seat frame 18 and having a front end joined to the cross tube 33 and a rear end joined to the seat frame 18. When joining, welding is for example employed. The rear frame 35 is in addition welded to the pivot frame 17. The rear frame 35 extends from the cross tube 33 upward to the rear and supports the seat frame 18 from below.

A plate-shaped first reinforcing member 36 provides a link between the first frame 34a and the second frame 34b. The first reinforcing member 36 is joined to the first frame 34a and the second frame 34b along linear boundary lines 37a and 37b via the plate-shaped edge. When joining, welding is for example employed. One edge 38a of the first reinforcing member 36 links one end of the boundary line 37a on the first frame 34a and one end of the boundary line 37b on the second frame 34b. A reinforcing rim 39 is formed along the edge. When forming the reinforcing rim 39 the edge 38a is subjecting to inflection processing or bend processing. Similarly, another edge 38b of the first reinforcing member 36 links the other end of the boundary line 37a on the first frame 34a and the other end of the boundary line 37b on the second frame 34b. A reinforcing rim 41 is formed along the edge 38b. When forming the reinforcing rim 41 the edge 38b is subjected to inflection processing or bend processing.

An opening 42 as a cutout hole is defined in the first reinforcing member 36. Defined at the edge of the opening 42 are a reinforcing rim 43a extending side by side with the boundary line 37a on the first frame 34a and a reinforcing rim 43b extending side by side with the boundary line 37b on the second frame 34b. Similarly, defined at the edge of the opening 42 are a reinforcing rim 43c extending side by side with the reinforcing rim 39 joining the one ends of the boundary lines 37a and 37b to each other and a reinforcing rim 43d extending side by side with the reinforcing rim 41 joining the other ends of the boundary lines 37a and 37b to each other. At the edge of the opening 42 the reinforcing rims 43a, 43b, 43c, and 43d may be seamless and continuous. The reinforcing rim 39 and the reinforcing rim 43c form one pseudo truss member. The reinforcing rim 41 and the reinforcing rim 43d form one pseudo truss member. The first reinforcing member 36 is disposed on an extension line from the seat frame 18. Therefore, a load acting on the first frame 34a from the axial direction of the seat frame 18 can be supported by the first reinforcing member 36. Here, 'side by side' means extending in the same direction as each other and includes extending in parallel with each other. The same applies below.

A plate-shaped second reinforcing member 45 provides a link between the down frame (third frame) 16 and the second frame 34b. The second reinforcing member 45 is joined to the down frame 16 along a first boundary line 46 via the plate-shaped edge. Similarly, the second reinforcing member 45 is joined to the second frame 34b along a linear second boundary line 47a and third boundary line 47b via the plate-shaped edge. The first boundary line 46 and the second boundary line 47a intersect each other. When joining, welding is for example employed. One edge 48a of the second reinforcing member 45 links one end of the first boundary line 46 on the down frame 16 and one end of the third boundary line 47b on the second frame 34b. A reinforcing rim 49 is formed along the edge 48a. When forming the reinforcing rim 49 the edge 48a is subjected to inflection processing or bend processing. The reinforcing rim 49 is connected to one end of the third boundary line 47b on an extension line from the reinforcing rim 41 of the first reinforcing member 36, curves downward, and is connected to the one end of the first boundary line 46. Another edge 48b of the second reinforcing member 45 links one end of the second boundary line 47a on the second frame 34b and the other end of the third boundary line 47b on the second frame 34b. A reinforcing rim 51 is formed along the edge 48b. When forming the reinforcing rim 51 the edge 48b is subjected to inflection processing or bend processing. The reinforcing rim 51 is connected to the one end of the third boundary line 47b on an extension line from the reinforcing rim 39 of the first reinforcing member 36, curves upward, and is connected to the one end of the second boundary line 47a.

Defined in the second reinforcing member 45 are a first depression 52 that is disposed between the down frame 16 and the reinforcing rim 49 and indented from the plate surface and a second depression 53 that is disposed between the reinforcing rim 49 and the reinforcing rim 51 and indented from the plate surface. Defined at the edge of the first depression 52 are a reinforcing bead 54a extending side by side with the first boundary line 46 on the down frame 16 and a reinforcing bead 54b extending side by side with the reinforcing rim 49. The reinforcing beads 54a and 54b are connected to each other via one end thereof. The other ends of the reinforcing beads 54a and 54b are linked to each other via a reinforcing bead 54c. Similarly, defined at the edge of the second depression 53 are a reinforcing bead 55a extending side by side with the third boundary line 47b of the second frame 34b, a reinforcing bead 55b that is continuous from the reinforcing bead 55a and extends side by side with the reinforcing rim 51, and a reinforcing bead 55c that is continuous from the reinforcing bead 55a and extends side by side with the reinforcing rim 49. One end of the reinforcing bead 55b and one end of the reinforcing bead 55c are linked to each other via a reinforcing bead 55d extending side by side with the reinforcing bead 54c of the first depression 52. The reinforcing beads 54a to 54c, 55a to 55d may be seamless and continuous at the edge of the respective depressions 52 and 53. The external shape of the first reinforcing member 36 and the external shape of the second reinforcing member 45 are formed so as to be connected to each other. The second reinforcing member 45 has a larger dimension in the fore-and-aft direction of the vehicle body than that of the first reinforcing member 36.

A plate-shaped third reinforcing member 57 provides a link between the first frame 34a and the second frame 34b. The third reinforcing member 57 is joined to the first frame 34a and the second frame 34b along linear boundary lines 58a and 58b respectively via a plate-shaped edge. When joining, welding is for example employed. Similarly, the third reinforcing member 57 is joined to the head pipe 14 along a linear boundary line 58c via a plate-shaped edge. An edge 59 of the third reinforcing member 57 links one end of the boundary line 58a on the first frame 34a and one end of the boundary line 58b on the second frame 34b. A reinforcing rim 61 is formed along the edge 59. When forming the reinforcing rim 61 the edge 59 is subjected to inflection processing or bend processing. The reinforcing rim 61 extends from the second frame 34b on an extension line of the reinforcing rim 51 of the second reinforcing member 45, bends, and is connected to one end of the boundary line 58a on the first frame 34a.

An opening 62 as a cutout hole is defined in the third reinforcing member 57. Defined at the edge of the opening 62 are a reinforcing rim 63a extending side by side with the boundary line 58a on the first frame 34a, a reinforcing rim 63b extending side by side with the boundary line 58b on the second frame 34b, a reinforcing rim 63c extending side by side with the boundary line 58c on the head pipe 14, and a reinforcing rim 63d extending side by side with the reinforcing rim 61. The reinforcing rims 63a, 63b, 63c, and 63d may be seamless and continuous at the edge of the opening 62. One pseudo truss member is formed from the reinforcing rim 61 and the reinforcing rim 63d.

In this embodiment, the body frame 12 includes the plate-shaped first reinforcing member 36 between the first frame 34a and the second frame 34b. Due to the action of the plate-shaped first reinforcing member 36, compared with a truss structure in which the first frame 34a and the second frame 34b are linked via a plurality of shaft materials, the number of components and production processes can be reduced. Furthermore, the stiffness in the fore-and-aft direction is increased compared with the truss structure. Similarly, the body frame 12 includes the plate-shaped second reinforcing member 45 between the second frame 34b and the down frame 16 (third frame). The down frame 16 can function as an engine hanger, when mounting the engine hanger the number of components and the number of production assembly steps can be reduced, and the stiffness of the structure can be increased.

As described above, in the body frame 12 the external shape of the first reinforcing member 36 and the external shape of the second reinforcing member 45 are formed so as to be connected. Therefore, the first reinforcing member 36 and the second reinforcing member 45 can be integrated with the second frame 34b held therebetween, and the stiffness of the structure can be increased. In addition, since the second reinforcing member 45 has a larger dimension in the fore-and-aft direction of the vehicle body than that of the first reinforcing member 36, the stiffness on the engine side can be increased.

Furthermore, since the first reinforcing member 36 has a cutout hole (opening 42), it is possible to prevent the vehicle body from chattering. The appearance is also improved. Similarly, since the second reinforcing member 45 has a depression (first depression 52 and second depression 53) that is indented from the plate surface, it is possible to prevent the vehicle body from chattering. The appearance is also improved.

As described above, the body frame 12 related to the present embodiment includes the first frame 34a having the front end joined to the head pipe 14 and the rear end joined to the pivot frame 17, the second frame 34b disposed beneath the first frame 34a and having the front end joined to the head pipe 14 and the rear end joined to the pivot frame 17, and the first reinforcing member 36 joined to the first frame 34a and the second frame 34b along the boundary lines 37a and 37b via the plate-shaped edge. The structural strength of the structure is enhanced. In particular, since the body frame 12 includes the reinforcing rims 39 and 41 extending from the boundary line 37a with the first frame 34a to the boundary line 47b with the second frame 34b, it is possible to build a truss structure having a plurality of shaft members with a single member. Since the first reinforcing member 36 has the opening 42 bounded by the reinforcing rims 43a, 43b, 43c, and 43d, the stiffness of the first reinforcing member 36 is increased. Since the second reinforcing member 45 has the depressions 52 and 53 bounded by the reinforcing beads 54a to 54c and 55a to 55d, high stiffness can be ensured.

The invention claimed is:

1. A body frame of a two-wheeled motor vehicle comprising a main frame including a pair of left and right first frames extending rearward from a head pipe, and a pair of left and right second frames disposed beneath the first frames respectively with a gap therebetween and extending rearward from the head pipe, and a pair of left and right third frames extending downward to a rear from a lower face of the pair of second frames respectively, wherein the body frame comprises:
  a plate-shaped first reinforcing member provided between each of the left and right first frames and each of the left and right second frames: and
  a plate-shaped second reinforcing member provided between each of the left and right second frames and each of the left and right third frames,
  wherein the first reinforcing member has a cut out hole in a central part, providing a link between an intermediate part in a longitudinal direction of each of the left and right first frames and an intermediate part in a longitudinal direction of each of the left and right second frames,
  wherein the first reinforcing member comprises two reinforcing rims extending from each of the left and right first frames to each of the left and right second frames, on opposite sides of the cut out hole in a fore-and-aft direction of a vehicle body, wherein the second reinforcing member has a depression in a central part, providing a link between the intermediate part in the longitudinal direction of each of the left and right second frames and each of the left and right third frames, wherein the second reinforcing member comprises, on opposite sides of the depression in the fore-and-aft direction of the vehicle body, two reinforcing rims extending downward from a lower face of each of the left and right second frames on extension lines of the two reinforcing rims of each of the left and right first reinforcing members, and wherein each of the left and right first reinforcing members and each of the left and right second reinforcing members have external shapes thereof connected via each of the left and right second frames.

2. The body frame for a two-wheeled motor vehicle according to claim 1, wherein each of the left and right second reinforcing members has a larger dimension in the fore-and-aft direction of the vehicle body than a dimension of each of the left and right first reinforcing members, wherein the external shape of the first reinforcing member between each of the left and right first frames and each of the left and right second frames is a straight line, and wherein the external shape of the second reinforcing member between each of the left and right second frames and each of the left and right third frames spreads out in going toward each of the left and right third frames, respectively.

\* \* \* \* \*